US012778165B2

(12) United States Patent
Breslin et al.

(10) Patent No.: US 12,778,165 B2
(45) Date of Patent: Nov. 3, 2026

(54) CEREAL MANUFACTURING PROCESS AND SYSTEM

(71) Applicant: Process Partners, Inc., Hudsonville, MI (US)

(72) Inventors: James C. Breslin, Zeeland, MI (US); Alicia Perdon, Northport, MI (US)

(73) Assignee: Process Partners, Inc., Hudsonville, MI (US)

( * ) Notice: Subject to any disclaimer, the term of this patent is extended or adjusted under 35 U.S.C. 154(b) by 0 days.

(21) Appl. No.: 19/192,452

(22) Filed: Apr. 29, 2025

(65) Prior Publication Data

US 2025/0374941 A1 Dec. 11, 2025

Related U.S. Application Data

(60) Provisional application No. 63/657,350, filed on Jun. 7, 2024.

(51) Int. Cl.
*A23L 7/135* (2016.01)
*A23L 7/10* (2016.01)

(52) U.S. Cl.
CPC ............ *A23L 7/135* (2016.08); *A23L 7/1975* (2016.08)

(58) Field of Classification Search
CPC .............................. A23L 7/135; A23L 7/1975
USPC .......................................................... 426/621
See application file for complete search history.

(56) References Cited

U.S. PATENT DOCUMENTS

| | | | | |
|---|---|---|---|---|
| 4,888,180 | A * | 12/1989 | Wu | A23L 7/178 426/445 |
| 5,505,978 | A | 4/1996 | Roy et al. | |
| 10,470,484 | B2 | 11/2019 | Breslin et al. | |
| 2009/0220654 | A1 | 9/2009 | Kino et al. | |
| 2013/0029026 | A1 | 1/2013 | Berckmans et al. | |
| 2014/0348991 | A1 * | 11/2014 | Rabe | A23L 5/15 426/241 |
| 2015/0327573 | A1 | 11/2015 | Uchii et al. | |

FOREIGN PATENT DOCUMENTS

CN 114586820 6/2022

OTHER PUBLICATIONS

International Search Report and Written Opinion of the International Searching Authority from corresponding Patent Cooperation Treaty (PCT) Application No. PCT/IB2025/055610, mailed Jul. 18, 2025.

* cited by examiner

*Primary Examiner* — Subbalakshmi Prakash
(74) *Attorney, Agent, or Firm* — Gardner, Linn, Burkhart & Ondersma LLP

(57) ABSTRACT

A process of preparing a finished food product from grains includes the steps of a first step of heating the grains to pre-gelatinize the grain starch, in the absence of added water, adding flavor to the pre-heated grains to form a pre-heated grain and flavor mixture, and a second step of heating the grain and flavor mixture to fully gelatinize the grain starch and allow flavor and color development via the Maillard reaction and to formed cooked grains.

22 Claims, 7 Drawing Sheets

CEREAL MANUFACTURING PROCESS AND SYSTEM

CROSS REFERENCE TO RELATED APPLICATION

The present application claims the benefit of U.S. provisional application Ser. No. 63/657,350, filed on Jun. 7, 2024, which is hereby incorporated in its entirety by reference herein.

TECHNICAL FIELD AND BACKGROUND

The present disclosure relates generally to processes and systems for reducing the amount of water and/or energy used during cereal manufacturing process.

The conventional process for manufacturing ready to eat cereal generally involves cooking grains, such as corn, wheat, rice and/or oats, with water and/or added flavor followed by a drying step to enable milling or shaping the cooked grain, such as flaking or bumping, and, optionally, another drying step prior to toasting or puffing, to give a product that is shelf stable (FIG. 1). The primary purpose of cooking is to gelatinize the grain starch by adding water and energy and to absorb and develop flavor. Usually, the resulting cooked grains has excess water and is too sticky for further processing. Thus, additional drying step is required to remove this excess water.

During current flaked and puffed cereal processing, for example, grains are cooked with added water and/or flavor solution in a cooker, such as a steam cooker, set at 15 to 25 psig (250 to 260° F.) for 0.5 to 2 hours. At these conditions, starch is gelatinized, and the flavor solution is absorbed and undergoes flavor and color development through the Maillard Reaction. The amount of water in the cooked grains also increases due to steam condensation and the moisture content of the resulting cooked grains goes up to around 25 to 35%. At these moisture contents, the cooked grains are sticky and need to be dried down to 14 to 22% moisture content for further processing, such as flaking and bumping. The energy required to remove this excess water has been estimated to be around 1.885 (KW per Kg). An exemplary flow diagram of the current cereal manufacturing process is shown in FIG. 3.

SUMMARY

Understanding and applying the kinetics of starch gelatinization, flavor absorption and flavor development are important in modifying processes while maintaining desired finished product attributes. A state diagram, a plot of the glass transition temperature, Tg, and gelatinization or melting temperature, Tm, of a grain's starch at different moisture contents, can be used to map the changes a grain goes through during processing. A state diagram generated for medium grain rice (FIG. 2) was used to identify cooking temperature and moisture content combinations that will gelatinize or melt the starch. The amount of water in the cooker is determined by the moisture contents of the grain and flavor ingredients plus additional water to clean pipes and steam condensation. In the current cooking process, the final moisture content is 27 to 33%. Referencing the state diagram (FIG. 2), the starch gelatinization temperature, Tm, is 240° F. at 30% moisture content. The current process sets the cooker at 15 to 25 psig (250 to 259° F.) for 0.5 to 2 hours, sufficient to gelatinize the starch and develop flavor. At lower moisture contents, the temperature required to gelatinize the starch increases. To reduce the cooked grains moisture content to 20%, the temperature during cooking must be at least 280° F., which can be reached using higher enthalpy. However, flavor and color development via Maillard Reaction at these higher temperatures (280° F. or more) and lower moisture contents will be very fast and can result in a cooked product with dark color as well as bitter flavor.

Accordingly, to minimize or eliminate drying of cooked grains, a multi-step cooking process is disclosed that uncouples starch gelatinization from flavor and color development. A first step involves a high enthalpy heating of just the grain (270° F. or more) to pregelatinize its starch. This step also sets the grain starch above its glass transition temperature Tg. for optimum absorption when flavor is added. A second step involves flavor addition followed by a low or a high enthalpy heating, depending on the product, of the pre-heated grain and flavors to allow flavor reactions to complete (250 to 259° F.). The resulting cooked grains may have a moisture content in a range of 18 to 25%, and optionally in a range of 20 to 21%.

In a first embodiment, depending on the final food product, when the moisture content of the cooked grains is between 18 to 21%, the cooked grains may be tempered to equilibrate the moisture, followed by milling the tempered cooked grains by bumping or flaking, drying the bumped cooked grains to a range of 10-12% moisture content, a second tempering of the dried bumped grain, toasting or puffing the tempered bumped grain, and coating and/or fortifying the toasted/puffed product before being packaged.

In a second embodiment, depending on the final food product, when the moisture content of the cooked grains is in a range of 14 to 18%, the cooked grains may be milled by flaking. This may then be followed by toasting or puffing, coating and/or fortifying before being packaged.

In a third embodiment, depending on the final food product, when the moisture content of the cooked grains is above 21%, the cooked grains may be dried to reduce the moisture content to below 21% and optionally in a range of about 14-18%. The drying step may then be followed by: tempering the dried grain to equilibrate moisture, milling the tempered cooked grains by bumping or flaking, toasting or puffing the bumped/flaked cooked grain, and coating and/or fortifying the toasted/puffed product before being packaged.

Thus, the present disclosure provides a process or system for decoupling changes occurring during the cooking process, namely, grain starch gelatinization and flavor development via Maillard reaction. This process or system can be achieved with less added moisture and, hence, requires less energy and less time for processing than current processes.

These and other objects, advantages, purposes, and features of the present disclosure will become apparent upon review of the following specifications in conjunction with the drawings.

DETAILED DESCRIPTION

Figure 1:
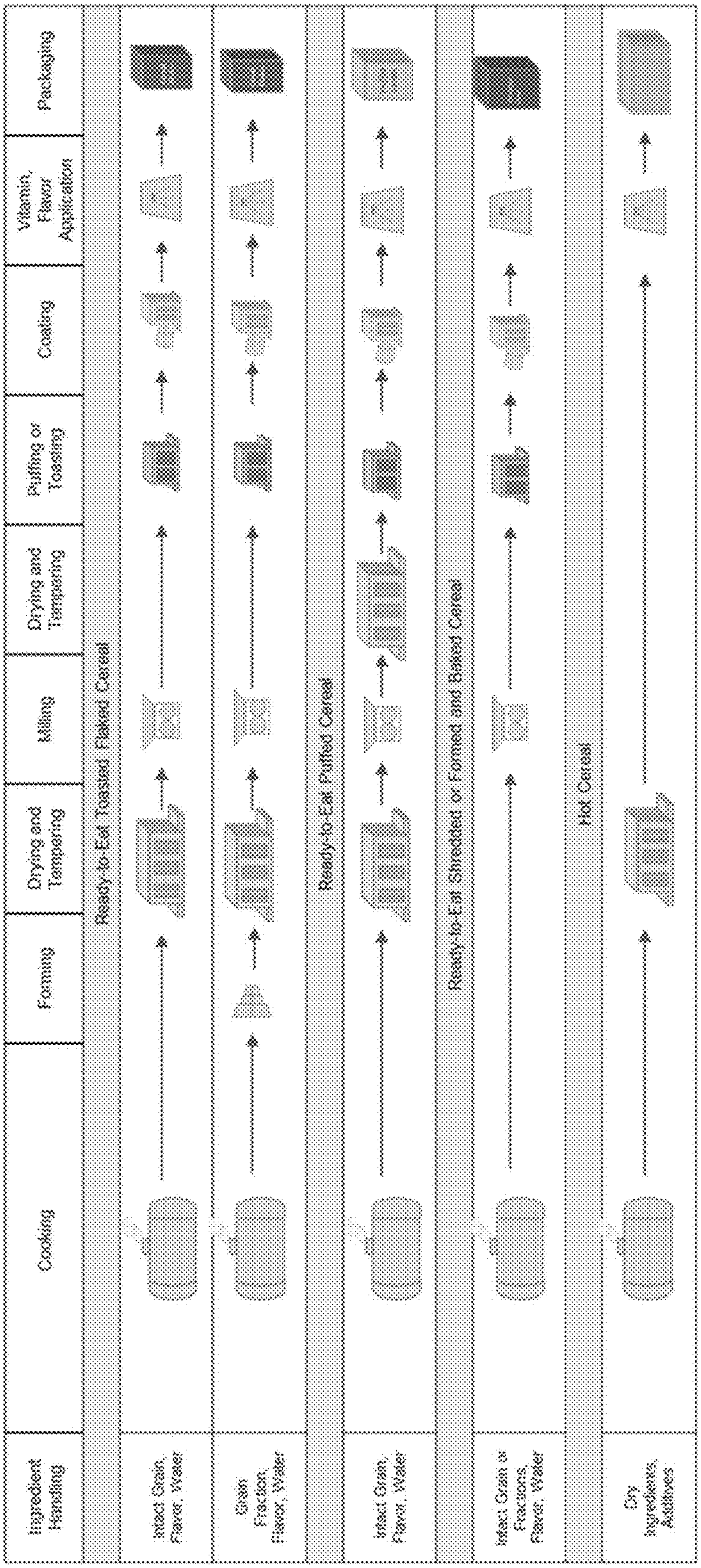
FIG. 1 is a schematic table of various current cereal manufacturing processes.
Figure 2:
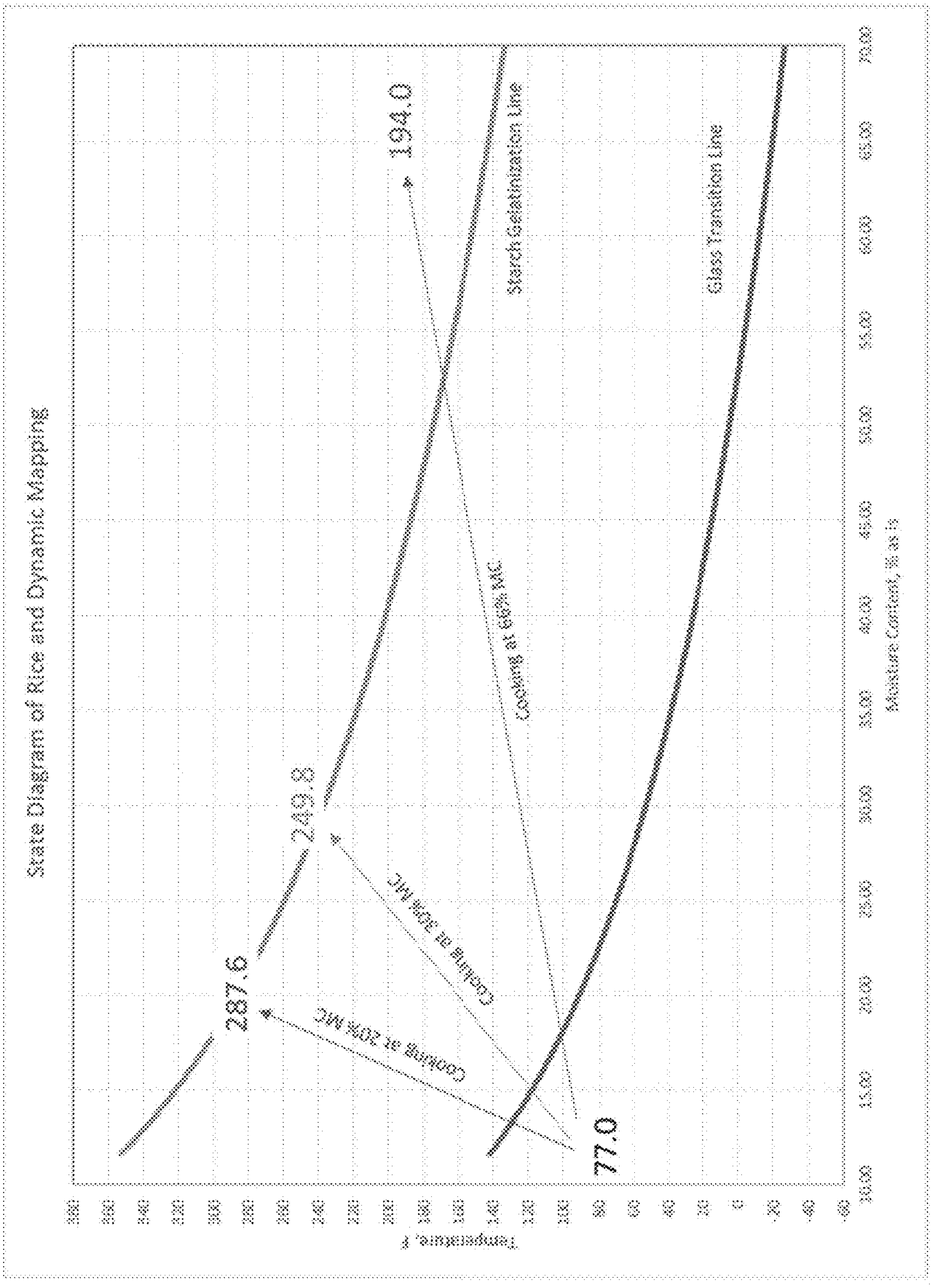
FIG. 2 is a state diagram illustrating rice starch glass transition temperatures, Tg, and gelatinization and/or melting temperatures, Tm, as a function of moisture content.
Figure 3:
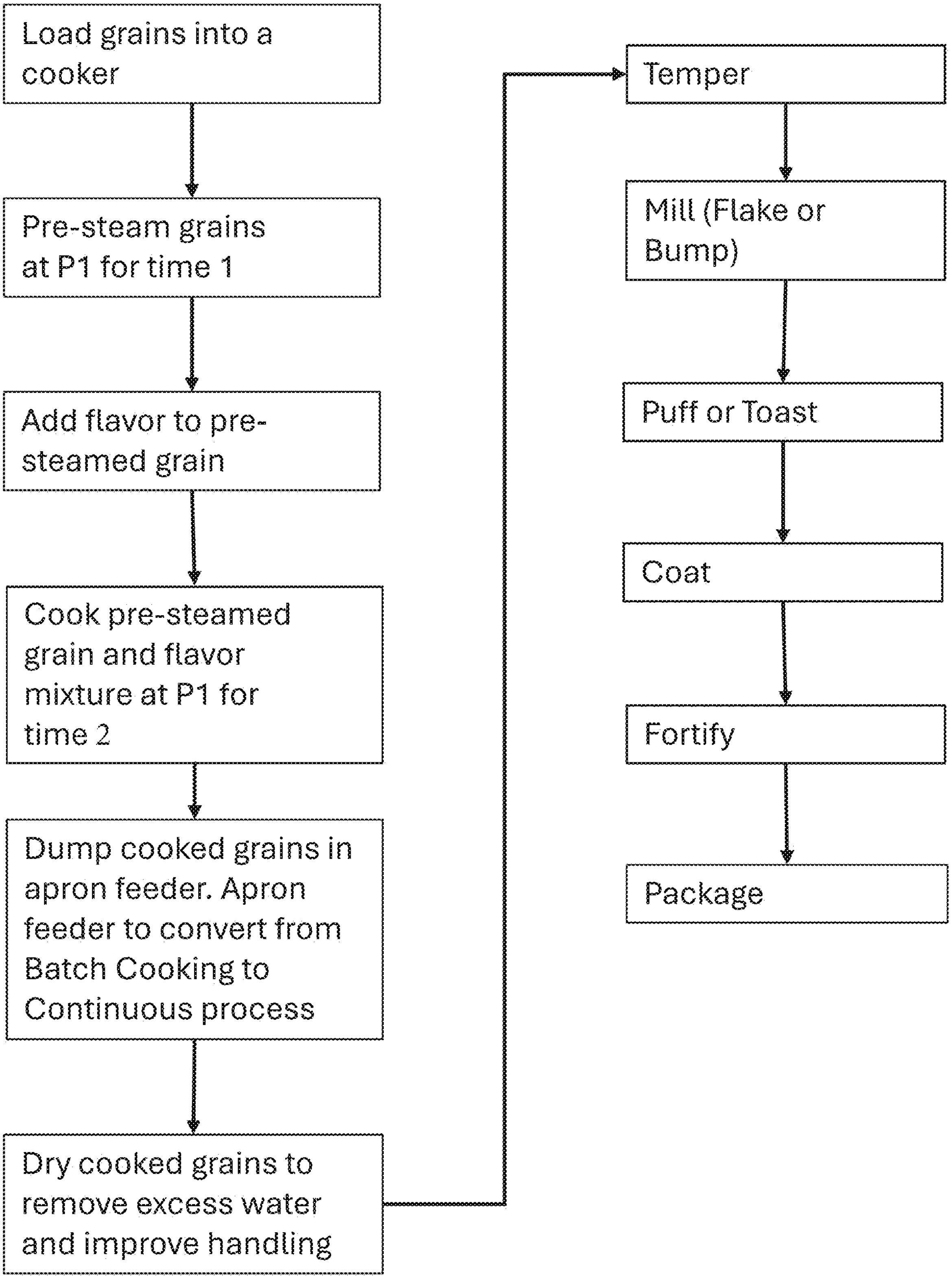
FIG. 3 PRIOR ART
FIG. 3 is a flowchart of a prior art grain cooking process.

Referring now to the drawings, processes of and a system for cooking grain is described where the starch gelatinization is initiated before and, hence, decoupled from flavor absorption and development.

Figure 4:
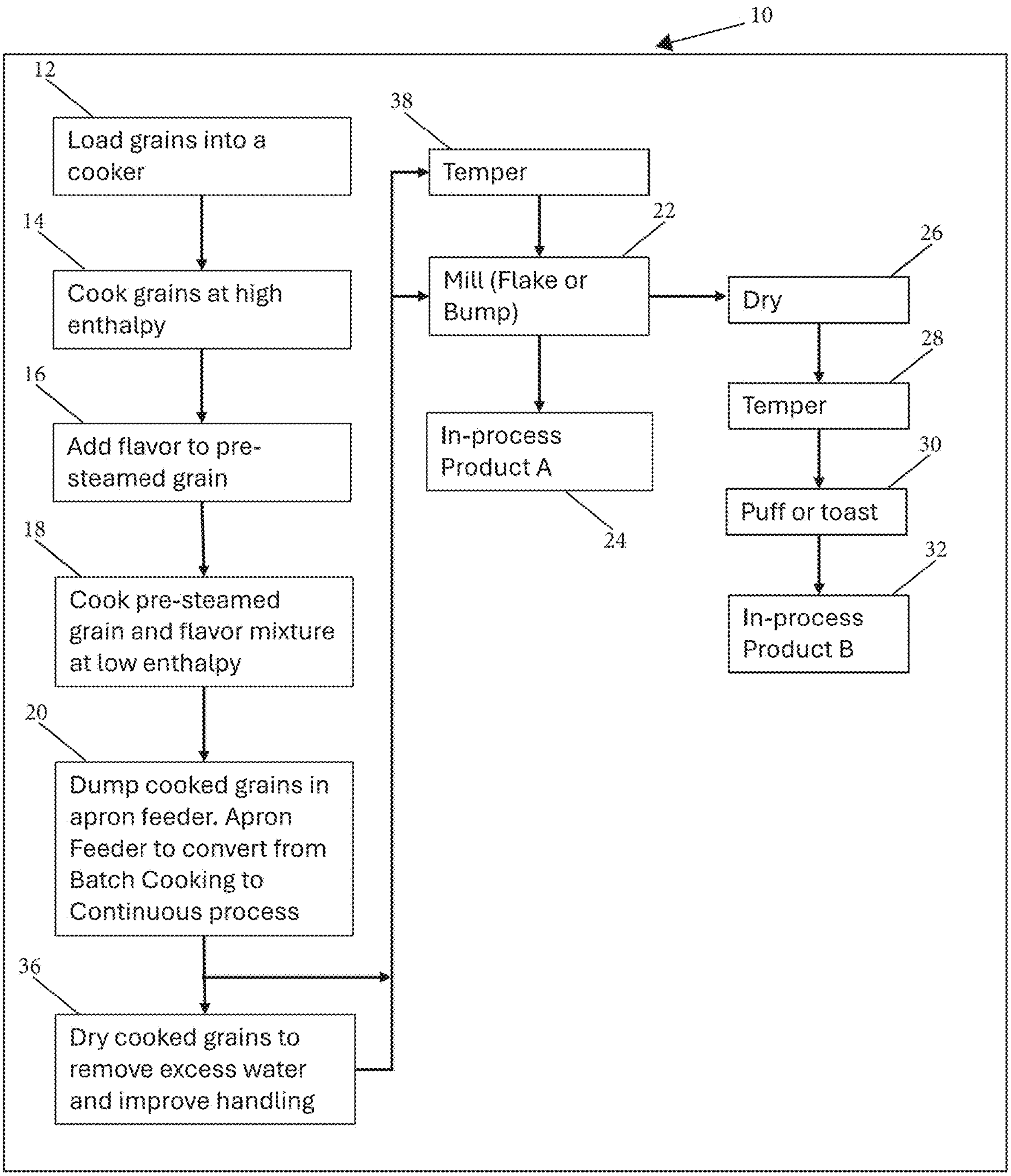
FIG. 4 is a flowchart of grain cooking processes illustrating optional and/or alternate steps, depending on the final food product, wherein the grain starch gelatinization is decoupled from the flavor development.

Referring to FIG. 4, the numeral 10 generally designates a process of cereal manufacture, which as noted decouples the grain starch gelatinization step from the flavor absorption and development step, thus, reducing the amount of moisture and energy used in the process, and potentially saving time. As will be more fully described below, depending on the final food product, process 10 may include various optional and/or alternate steps leading to a final food product.

Referring again to FIG. 4, process 10 is initiated by loading grains into a cooker (12), such as a steam cooker. As described above, grains may include corn, wheat, rice, oats, or quinoa, or a mixture thereof. To reduce moisture and energy needed for processing, no water is added at this step. In other words, the gelatinzation step is started in the absence of added water. The grains are then heated in the cooker (14) at a temperature T1 (with a first enthalpy E1) for a time t1 to at least initiate gelatinization of the grain starch. Heating may include steaming with saturated or superheated steam. The moisture content of the grain increases during this step due to steam condensation, and this increase in moisture content plus, as noted, the heat at least initiates gelatinization of the grain starch.

Temperature T1 may fall in a range of about 270 to 320° F., in a range of 270 to 285° F., or about 280° F.

Time t1 may fall in a range of about 15 to 30 minutes, in a range of 15-25 minutes, and optionally about 20 minutes.

In one embodiment, enthalpy E1 may fall in a range of about 2600-2800 Kjoules/Kg, and optionally about 2700 Kjoules/Kg.

In another embodiment, E1 may fall in a range of about 2700-2800 Kjoules/Kg, and optionally about 2750 Kjoules/Kg.

In yet another embodiment, E1 may fall in a range of about 2707-2749 Kjoules/Kg, and optionally about 2731 Kjoules/Kg.

After the grains are pre-heated, flavor is added (16). For example, the flavor is added into the pre-heated grains in the form of a liquid flavor solution. Optionally, the flavor may be a concentrated liquid flavor solution. The grain moisture content at this stage is about 15 to 20%, and optionally about 17-18%. After the flavor is added, the grain and flavor mixture is then heated (18) at a temperature T2 (with a second enthalpy E2) for time t2.

In one embodiment, temperature T2 may fall in a range of about 250 to 260° F. or about 257° F.

In another embodiment, temperature T2 may fall in a range of about 270 to 285° F. or about 280° F.

Time t2 may fall in a range of about 15-20 minutes, and optionally about 17 minutes.

In one embodiment, enthalpy E2 may fall in a range of about 2600 to 2750 Kjoules/Kg, and optionally about 2715 Kjoules/Kg.

In another embodiment, enthalpy E2 may fall in a range of about 2700-2750 Kjoules/Kg, and optionally about 2715 Kjoules/Kg.

In yet another embodiment, enthalpy E2 may fall in a range of about 2700-2749 Kjoules/Kg, and optionally about 2710 Kjoules/Kg.

The resulting cooked grains may be ready for further processing without drying and/or tempering, depending on its moisture content. The cooked grains moisture content will be in a range of 18 to 33%, and optionally about 20-21% moisture content.

Optionally, in batch processing, the cooked grains may be dumped in a feeder (20), such as Apron feeder, ready for the next step of the process. For continuous processing, a feeder may be omitted.

If the cooked grains have a moisture content in a range of about 14-21%, depending on the final food product (Product A or Product B—see FIG. 4), the cooked grains may be then fed directly to a milling apparatus to mill the cooked grains (22), such as by bumping or flaking (22). The milled product can then be optionally dried (26), tempered (28), toasted or puffed (30), coated and/or fortified before packaging, as noted below.

On the other hand, if at step (20), the moisture content of the cooked grains is in a range of about 14 to 21%, depending on the final food product, the cooked grains may be fed to a dryer (36) to reduce its moisture content to about 14 to 18%. Further, the dried cooked grains is then fed to the tempering apparatus (38) for tempering. For example, the dried cooked grains may be tempered for about 15-30 minutes prior to milling. Tempering may include subjecting the cooked grains to constant temperatures ranging from about 120 to 180° F.

Thereafter, the tempered dried cooked grains is fed to the forming, shaping, or milling apparatus (122), and then followed by the optional steps enumerated above.

Thus, by decoupling starch gelatinization from flavor development, the amount of moisture and energy to transform the grain and flavor components to its final product form can be reduced. For example, as noted above, for current processes, the moisture content of the cooked grains is around 26-33%, depending on the product. The time required to process raw grains to tempered dried cooked grains ready for milling is about 76 minutes and requires about 1881 KW per Kg of total energy. For the present disclosed processes where the cooked grains moisture content is around 20% the time required to process the raw grains to tempered cooked grains ready for milling is about 50 minutes and requires about 191 KW per Kg of total energy. This amounts to significant savings in time and energy, while still preserving the quality of the final product.

As will be more fully described below, a system or various systems may be used to prepare grains for use as a processed grain product using the processes described above. For case of reference, common components of the systems described below are numbered with like numbers. Further, it should be understood that the systems described below can be combined as a single system but configured to handle or transfer the cooked grain product differently between the components of the system depending on the type of grain being processed.

Figure 5A:
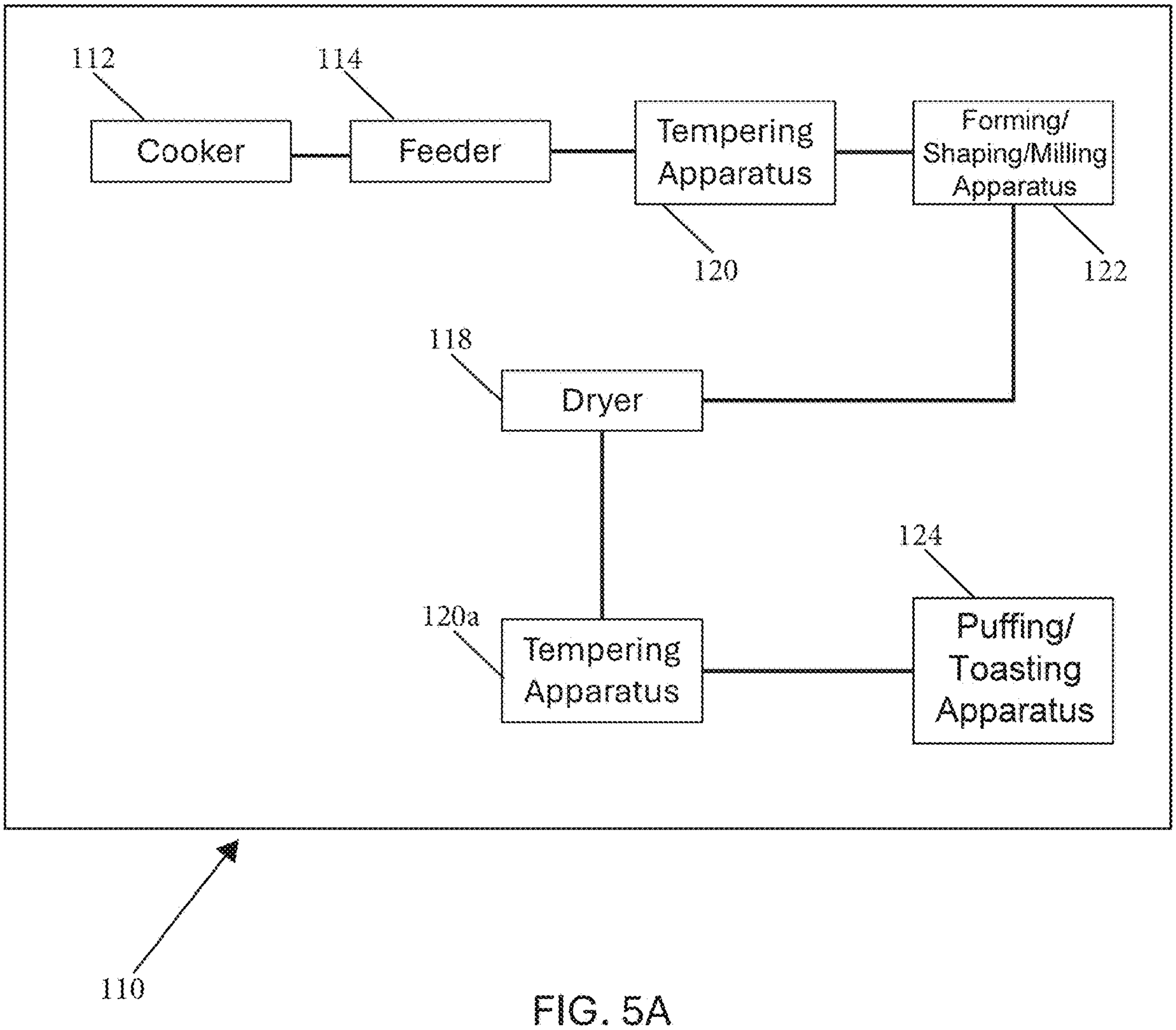
FIG. 5A is a schematic drawing of a first embodiment of a cooking system operable to prepare grains for use as a processed grain product, such as for use in ready-to-eat cereals, using the processes of FIG. 4.

In one embodiment illustrated in FIG. 5A, a processing system 110 is configured to prepare puffed rice products. Referring again to FIG. 5A, system 110 includes a cooking apparatus 112, such as a steam cooker, which is configured to heat, such as by steaming, the grains. For puffed rice products, the cooked grains may have a moisture content in a range of 18 to 21%. As noted above, after the multi-step cooking process is complete (as described above), system 110 may feed the cooked grains via a feeder 114, such as an Apron Feeder, to one of several apparatuses described below for further processing.

In the illustrated embodiment, after cooking, the system 110 is configured to feed the cooked grains directly to a first tempering apparatus 120 and thereafter to feed the tempered cooked grains to forming, shaping or milling apparatus 122 for forming, shaping or milling the tempered cooked grains. A suitable milling apparatus may include rolls to bump or flake the cooked grains. After milling, system 110 may then feed the tempered cooked grains to a dryer 118 to reduce the cooked grains to a range of 10-12% moisture content. Dryer 118 may be formed by one or more heaters, such as direct combustion or steam heaters, with the cooked grains conveyed on one or more conveyors adjacent the heaters. After drying the cooked grains, system 110 may feed the dried cooked grains to a second tempering apparatus 120*a*. For example, tempering apparatuses 120 and 120*a* may be formed by a chamber with a low velocity humid environment, for example, which does not add energy or take energy away from the cooked grains and, instead, allows the moisture in the grains to equilibriate so that a desired amount of tempering (moisture equilibration) takes place for the dried cooked grain.

After the second tempering apparatus, system 110 then feeds the tempered, dried, cooked grains to apparatus 124, such as a puffer or toaster. After the puffing or toasting process is complete, the finished grain product can then be optionally coated and/or fortified before packaging.

Figure 5B:
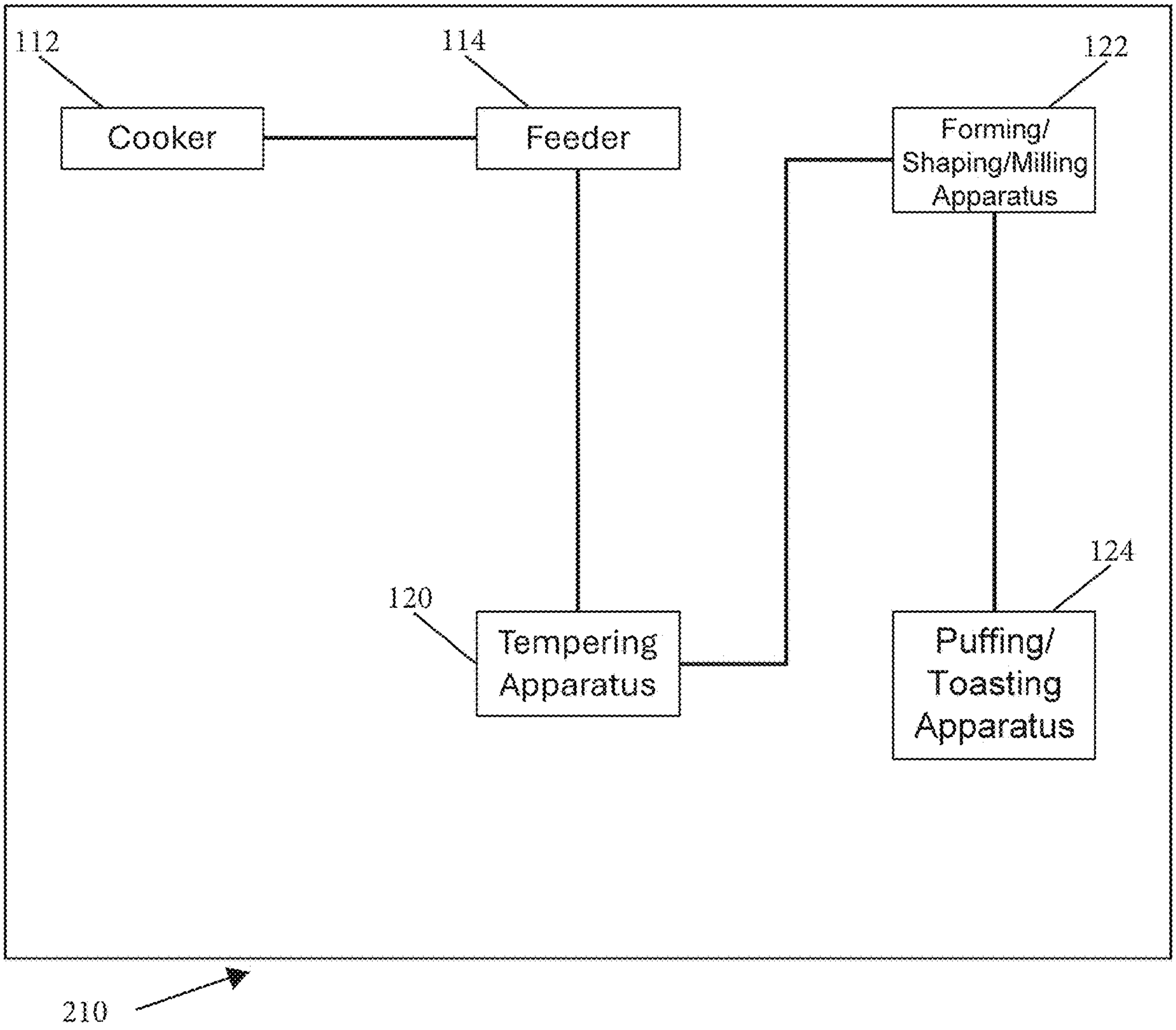
FIG. 5B is a schematic drawing of a second embodiment of a cooking system operable to prepare grains for use as a processed grain product, such as for use in ready-to-eat cereals, using the processes of FIG. 4.

In a second embodiment, referring to FIG. 5B, system 210, which also includes cooking apparatus 112 and feeder 114, is configured for processing grains without any drying steps, as described above, and, therefore, omits or bypasses the dryer. Instead, system 210 feeds the cooked grains to tempering apparatus 120, or in some cases directly to the forming, shaping or milling apparatus 122, which may be configured to flake the cooked grains. After the milling process, system 210 then feds the flaked cooked grains to apparatus 124, such as a toasting apparatus. Again, after toasting is complete, the finished grain product can then be optionally coated and/or fortified before packaging.

Figure 5C:
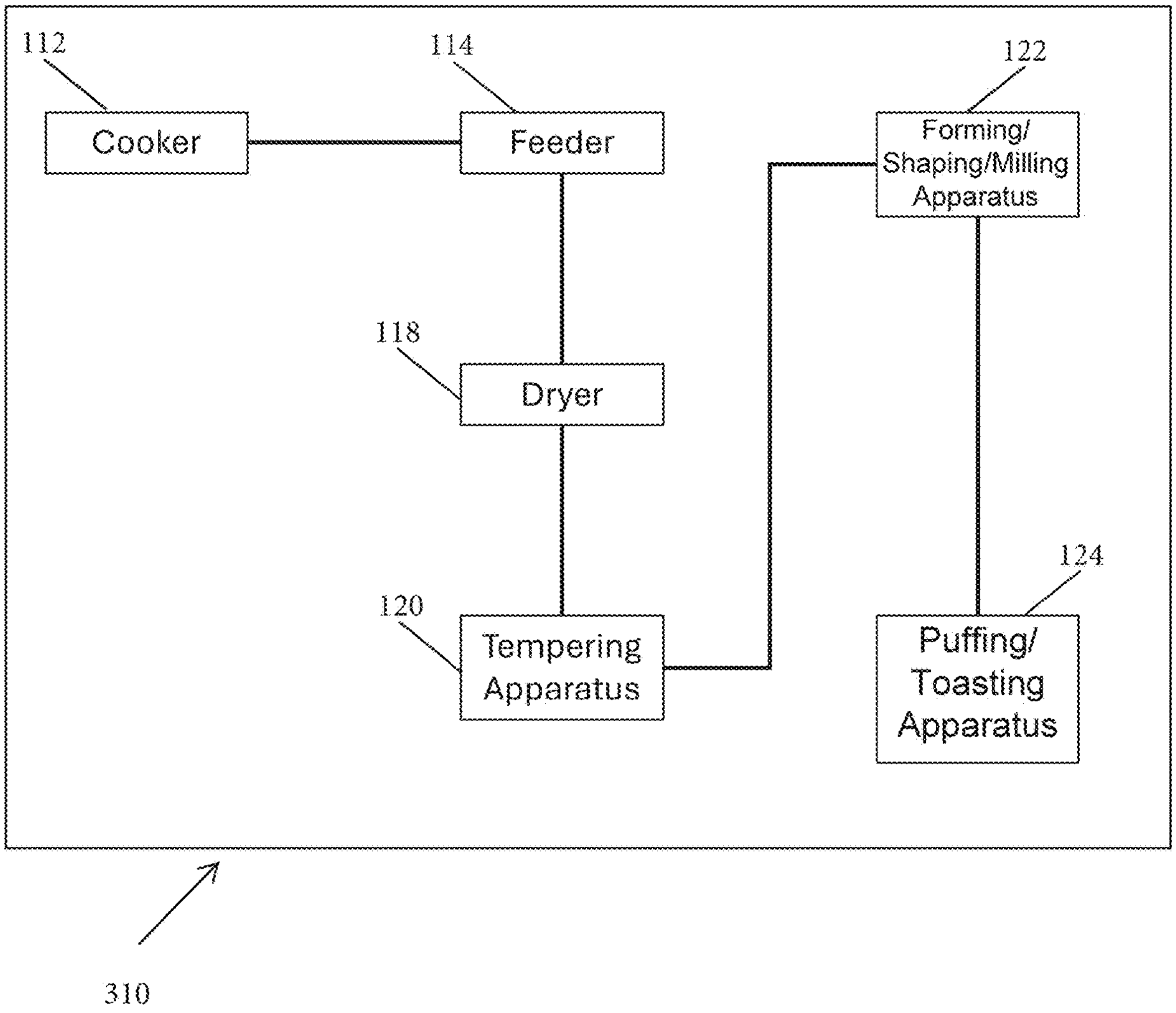
FIG. 5C is a schematic drawing of a third embodiment of a cooking system operable to prepare grains for use as a processed grain product, such as for use in ready-to-eat cereals, using the processes of FIG. 4.

In a third embodiment, such as shown in FIG. 5C, system 310, which also includes cooking apparatus 112, feeder 114, and dryer 118, is configured for processing flaked cereal, where the moisture content of the cooked grains is above 21%. System 310 feeds the cooked grains to dryer 118 to reduce its moisture content to about 14-18%. To equilibrate the moisture in the dried cooked grains, system 310 also may include tempering apparatus 120. For example, as noted above, tempering apparatus 120 ensures that a desired amount of tempering (moisture equilibration) takes place for the dried cooked grain. After tempering the dried cooked grains in the tempering apparatus 120, system 310 then feeds the tempered cooked grains to forming, shaping or milling apparatus 122.

After milling, system 310 then feds the milled cooked grains to apparatus 124, such as a puffing or toasting apparatus. Again, after the puffing or toasting is complete, the puffed or toasted product can then be optionally coated and/or fortified before packaging.

Therefore, the present disclosure provides a process for preparing raw grain to produce a shelf-stable finished food product by modifying the cooking process to eliminate or minimize the drying process, while still achieving the desired moisture levels for forming and/or milling the cooked grains into their desired form before further processing. This significantly reduces the amount of water and/or energy needed in the cereal manufacturing process.

Changes and modifications to the specifically described embodiments may be carried out without departing from the principles of the present disclosure, which is intended to be limited only by the scope of the appended claims, as interpreted according to the principles of patent law, including the doctrine of equivalents.

The invention claimed is:

1. A process of preparing a finished food product from grains having grain starch with starch molecules, said process comprising the steps of:

a first step of pressurized heating the grains in a pressurized cooker to heat the starch molecules to gelatinize the starch molecules in the absence of added water to form pre-heated grains;

adding flavor to the pre-heated grains to form a pre-heated grain and flavor mixture; and a second step of pressurized heating the pre-heated grains and flavor mixture in a pressurized cooker and allow flavor and color development via the Maillard reaction and to form cooked grains.

2. The process of claim 1, wherein the starch molecules have a glass transition temperature, and said first step of pressurized heating in a pressurized cooker includes heating the starch molecules under pressure above said glass transition temperature to form said pre-heated grains wherein the starch molecules are fully gelatinized and the gelatinization of the starch molecules is decoupled from flavor absorption and development.

3. The process of claim 2, wherein said first step of pressurized heating the grains in a pressurized cooker is at a first enthalpy and conducted under pressure for a period of about 15-30 minutes or about 20 minutes, and at a temperature in a range of about 270-290° Fahrenheit or about 289° Fahrenheit.

4. The process of claim 3, wherein said second step of pressurized heating the pre-heated grains and flavor mixture in a pressurized cooker is at a second enthalpy and conducted under pressure for a period of about 15-20 minutes, or about 17 minutes at a temperature of about 250 to 260° Fahrenheit or of about 257° Fahrenheit, and wherein the second enthalpy is less than the first enthalpy.

5. The process of claim 2, wherein said first step of pressurized heating the grains in a pressurized cooker is conducted under pressure for a period of about 15-30 minutes or about 20 minutes and at an enthalpy in a range of about 2600-2800 Kjoules/Kg or of about 2700 Kjoules/Kg.

6. The process of claim 2, wherein said second step of pressurized heating the pre-heated grains and flavor mixture in a pressurized cooker is conducted under pressure for a period of 15-20 minutes or about 17 minutes at an enthalpy in a range of 2600-2750 or of about 2715 (Kjoules/Kg).

7. The process of claim 2, wherein said first step of pressurized heating the grains in a pressurized cooker is for a period of about 15-25 minutes, and optionally about 20 minutes, in a cooker that generates an enthalpy in a range of about 2700 to 2800 Kjoules/Kg, or of about 2750 Kjoules/Kg.

8. The process of claim 2, wherein said second step of pressurized heating the pre-heated grains and flavor mixture in a pressurized cooker is conducted under pressure for a period of 15-20 minutes or about 17 minutes at an enthalpy in a range of about 2700 to 2750 Kjoules/Kg, or of about 2715 Kjoules/Kg.

9. The process of claim 2, wherein said first step of pressurized heating the grains in a pressurized cooker is at a first enthalpy and conducted under pressure for a period of about 20 minutes, at a temperature of about 280° Fahrenheit, wherein said second step of pressurized heating the pre-heated grains and flavor mixture in a pressurized cooker is at a second enthalpy and conducted under pressure for a period of about 17 minutes at about 257° Fahrenheit, and wherein the second enthalpy is less than the first enthalpy.

10. The process of claim 2, wherein said first step of pressurized heating the grains in a pressurized cooker is conducted under pressure for a period of about 15-25 minutes, and optionally about 20 minutes, at an enthalpy of 2700-2800-Kjoules/Kg, and optionally at of about 2750 Kjoules/Kg, and wherein said second step of pressurized heating the pre-heated grains and flavor mixture in a pressurized cooker is at an enthalpy lower than in said first step of pressurized heating and conducted for a period of 15-20 minutes and optionally 17 minutes.

11. The process of claim 2, wherein said first step of pressurized heating the grains in a pressurized cooker is conducted under pressure for a period of about 15-25 minutes, and optionally about 20 minutes, in a cooker that generates an enthalpy in a range of about 2707 to 2749 Kjoules/Kg or about 2731 Kjoules/Kg.

12. The process of claim 11, wherein said second step of pressurized heating the pre-heated grains and flavor mixture in a pressurized cooker is at an enthalpy less than in said first step of pressurized heating and conducted under pressure for a period of 15-20 minutes and optionally 17 minutes in a cooker that generates an enthalpy in a range of about 2700-2749 Kjoules/Kg, or of about 2710 Kjoules/Kg.

13. The process of claim 1, further comprising tempering the cooked grains prior to milling, optionally drying the cooked grains after milling, and further optionally applying a second step of tempering after drying.

14. The process of claim 13, wherein said tempering includes subjecting the cooked grains to constant temperatures ranging from about 120 to 180 degrees Fahrenheit for about 15-30 minutes.

15. The process of claim 1, further comprising drying the cooked grains.

16. The process of claim 15, wherein said drying occurs after the second step of pressurized heating.

17. The process of claim 13, further comprising milling the cooked grains.

18. The process of claim 17, wherein said milling occurs after said tempering.

19. The process of claim 16, wherein said milling occurs before said tempering.

20. The process of claim 15, further comprising milling the cooked grains, wherein said milling occurs before said drying.

21. The process of claim 17, further comprising puffing or toasting the cooked grains.

22. The process of claim 21, wherein said puffing or toasting the cooked grains occurs after the milling step.

* * * * *